United States Patent [19]

Bruno

[11] Patent Number: 5,193,131
[45] Date of Patent: Mar. 9, 1993

[54] OPTOELECTRONIC DEVICE WITH AN INTEGRATED OPTICAL GUIDE AND PHOTODETECTOR

[75] Inventor: Adrien Bruno, Palaiseau, France

[73] Assignee: France Telecom Etablissement Autonome De Droit Public, Paris, France

[21] Appl. No.: 875,018

[22] Filed: Apr. 28, 1992

[30] Foreign Application Priority Data

Apr. 30, 1991 [FR] France ................................ 91 05299

[51] Int. Cl.⁵ ............................................. G02B 6/10
[52] U.S. Cl. ......................................... 385/14; 385/30; 385/131; 257/189; 257/432
[58] Field of Search ...................... 385/14, 30, 47, 129, 385/130, 131, 132; 357/29, 30, 40

[56] References Cited

U.S. PATENT DOCUMENTS

| | | | |
|---|---|---|---|
| 4,047,801 | 9/1977 | Challeton et al. | 385/130 X |
| 4,715,672 | 12/1987 | Duguay et al. | 385/129 X |
| 4,747,649 | 5/1988 | Heinen et al. | 385/130 X |
| 4,760,569 | 7/1988 | Mahlein | 359/130 X |
| 4,762,382 | 8/1988 | Husain et al. | 385/132 |
| 4,857,973 | 8/1989 | Yang et al. | 357/15 |
| 4,938,836 | 7/1990 | Carenco et al. | 385/130 |
| 4,966,430 | 10/1990 | Weidel | 385/130 |
| 5,015,051 | 5/1991 | Castera et al. | 385/130 X |
| 5,123,078 | 6/1992 | Thomas | 385/130 |
| 5,125,054 | 6/1992 | Ackley et al. | 385/14 X |
| 5,134,681 | 7/1992 | Ratovelomanana et al. | 385/130 |

FOREIGN PATENT DOCUMENTS

| | | | |
|---|---|---|---|
| 0298333 | 1/1989 | European Pat. Off. | 385/129 X |
| 2226754 | 11/1974 | France | 385/14 X |

OTHER PUBLICATIONS

Applied Optics, vol. 29, No. 18, Jun. 20, 1990, pp. 2781-2791, T. Baba et al.,: "High Efficiency Light Coupling From Anti-Resonant Reflecting Optical Waveguide to Integrated Photodetector Using An Antireflecting Layer".

IEEE Photonics Technology Letters, vol. 2, No. 7, Jul. 1990, pp. 496-498, R. J. Deri, et al.,: "Integrated Waveguide/Photodiodes with Large Bandwidth and High External Quantum Efficiency".

*Primary Examiner*—Brian Healy
*Attorney, Agent, or Firm*—Oblon, Spivak, McClelland, Maier & Neustadt

[57] ABSTRACT

Optoelectronic device with an integrated optical guide and photodetector. This device comprises a partial reflecting layer (CR) inserted between the lower confinement layer (CiC) and the guide layer (CG). Application to optical telecommunications.

12 Claims, 4 Drawing Sheets

OPTOELECTRONIC DEVICE WITH AN INTEGRATED OPTICAL GUIDE AND PHOTODETECTOR

BACKGROUND OF THE INVENTION

The present invention relates to an optoelectronic device with an integrated optical guide and photodetector. It is used in optoelectronics and in particular optical telecommunications, where the device according to the invention can constitute the optical receiver of a heterodyne reception circuit.

The device according to the invention can also be used in optical interconnections between high speed electronic chips with a high degree of integration, or between computers, or within computers.

An optoelectronic device with an integrated optical guide and photodetector is shown in FIG. 1, with three slightly different embodiments. In all these embodiments the device comprises, on a semiconductor substrate S and in succession: a first lower confinement layer CiC made from a first material having a first index (n1), a second guide layer CG made from a second material and having a second index (n2) higher than the first (n1) and a third upper confinement layer CsC made from a third material with a third index (n3) lower than that of the second material (n2).

This structure is completed by a detector D positioned at different locations as a function of the embodiment, either in the lower part of the substrate (part a in FIG. 1), a mirror M at 45° reflecting the light from the guide layer downwards, or at the end of the guide layer (part b), or above the guide layer (part c) for an evanescent wave operation.

The device according to the invention relates to the third embodiment, i.e. that which will be described in greater detail hereinafter.

An integrated detector—guide device with coupling by evanescent wave is e.g. described in the article by R. J. DERI et al entitled: "Integrated Waveguide/Photodiodes with Vertical Impedance Matching", published in "Proceedings of the 1989 IEDM", Washington D. C., December, 1989.

Although satisfactory in certain respects, all evanescent wave coupling devices have the disadvantage of requiring a significant length for the detector, in order to obtain a total absorption of the optical radiation. However, this necessity is contrary to one of the sought objectives, namely the reduction of the response time of the device, which would lead to the reduction of the surface of the detector and consequently its length.

In order to better understand the origin of this problem and the solutions proposed by the prior art, reference can be made to the attached FIGS. 2 and 3, where two known embodiments are shown in greater detail. In these drawings, part a is a plan view, part b a section at the entrance of the detector and part c a section at the exit of the detector. The circular or elongated spot FL represents a section of the light beam propagating in the device.

The least absorbing devices have, between the guide layer CG and the absorbent material Ab, an upper confinement layer CsC in the form of a guide for maintaining the transverse confinement on an approximately 3 μm band (cf. FIG. 3). However, the separation between the guide and the absorbent reduces the absorption by evaescence.

A structure of this type is described by J. A. CAVAILLES et al in the article entitled "Integration of Detectors with GaInAsP/InP Carrier Depletion Optical Switches", published in "Electronics Letters", Oct. 11, 1990, vol. 26, no. 21, p. 1783.

Moreover, M. C. AMMAN in an article entitled "Analysis of a PIN Photodiode with Integrated Waveguide", published in "Electronics Letters", Aug. 13, 1987, vol. 23, no. 17, p. 895 sought the optimum thickness for the absorbent leading to a maximum absorption. However, this constraint makes it technically difficult to obtain the detector and only modifies by a factor of 2 the absorption coefficient.

Another problem caused by these devices is associated with the detector width, i.e. the dimension perpendicular to the guide (dimension visible in parts b and c of FIGS. 2 and 3). It is possible to make a distinction between two detector types, depending on whether the width is significant (FIG. 2) or not (FIG. 3). The wide detectors are used for avoiding lateral losses due to the natural widening of the beam. For example, a width of 32 μm is used by R. J. DERI et al, referred to hereinbefore, for 5 to 7 μm guide widths. In this case, for a detector length of 190 μm, the beam widens and passes from 7 μm at the entrance to the detector to 15 μm at the exit, as shown in parts b and c of FIG. 2. Thus, the detector width would have to exceed 20 μm to bring about total absorption.

A limited width of 3 μm (for a length of 100 μm) was used by J. A. CAVAILLES et al, referred to hereinbefore, with a beam guided laterally (i.e. without widening) by an InP ribbon layer etched with a thickness of 0.2 μm above the guide layer (cf. parts b and c of FIG. 3). However, the upper InP confinement layer between the absorbent and the guide reduces the absorption.

R. J. DERI et al propose shortening the absorption length by introducing an anti-reflection layer between the guide layer CG and the absorbent Ab. The index and thickness of this layer must be chosen so as to reduce the reflection at the interface between the guide layer and the absorbent layer. Taking 3.162 for the index of the guide and 3.53 for the index of the absorbent, a good index choice consists of taking an intermediate value of e.g. 3.22. The maximum absorption value corresponds to an anti-reflection layer thickness between 0.5 and 0.6 μm. The value chosen by R. J. DERI et al is 0.55 μm. The structure then has the appearance shown in FIG. 4, where the anti-reflection layer carries the reference CaR.

For a given anti-reflection layer thickness, a simple absorption calculation gives a 90% absorption for a length of 190 μm in agreement with the value chosen experimentally by R. J. DERI et al. However, said layer increases the thickness of the intrinsic zone and therefore increases the transit time of the charge carriers created by the absorbed beam. Only a photoconductive diode or a M.S.M. diode makes it possible to reduce the response time, because the electric field in this case is applied to the surface. Although the detector length is reduced by the use of said anti-reflection layer, the surface of the detector still remains relatively large.

SUMMARY OF THE INVENTION

The object of the invention is to obviate all these disadvantages associated with the varying absorption and the varying detection speed. To this end, the invention proposes a device with an integrated optical guide and photodetector designed to lead to a complete absorption of the light and to have a reduced response time.

This result is achieved by using a partial reflecting layer inserted between the lower confinement layer and the guide layer. Said layer is placed beneath the absorbent layer. It is made from a material having an index (n5), whose value is outside the range defined by the first index (n1) of the lower confinement layer and the second index (n2) of the guide layer.

The index of the partial reflecting layer is preferably below the index of the lower confinement layer. In the case where the index is higher than that of the guide layer, said layer becomes guiding and reduces the absorption.

According to a first embodiment, the partial reflecting layer is located in the guide and in the lower part thereof.

According to a second embodiment, the partial reflecting layer is located in the lower confinement layer and in the upper part thereof.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
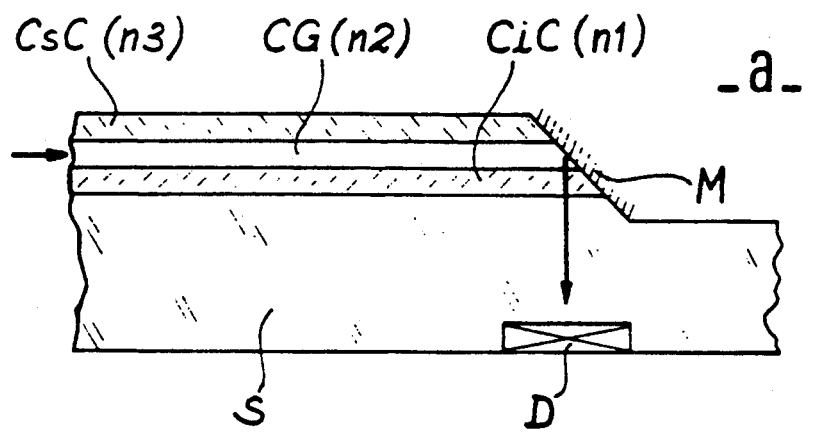
FIG. 1(a), (b), (c), already described, in section three known variants of an optoelectronic device having an integrated optical guide and photodetector.
Figure 1:
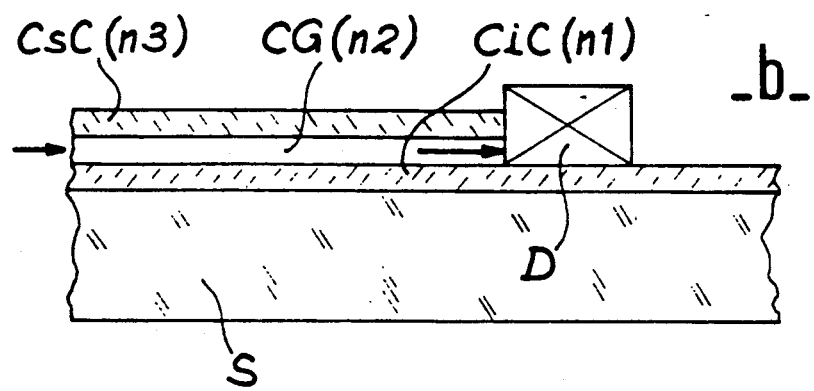
Figure 1:
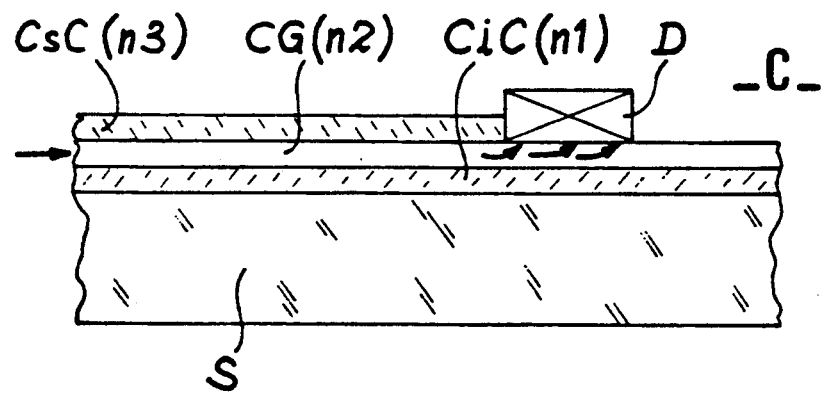
Figure 2:
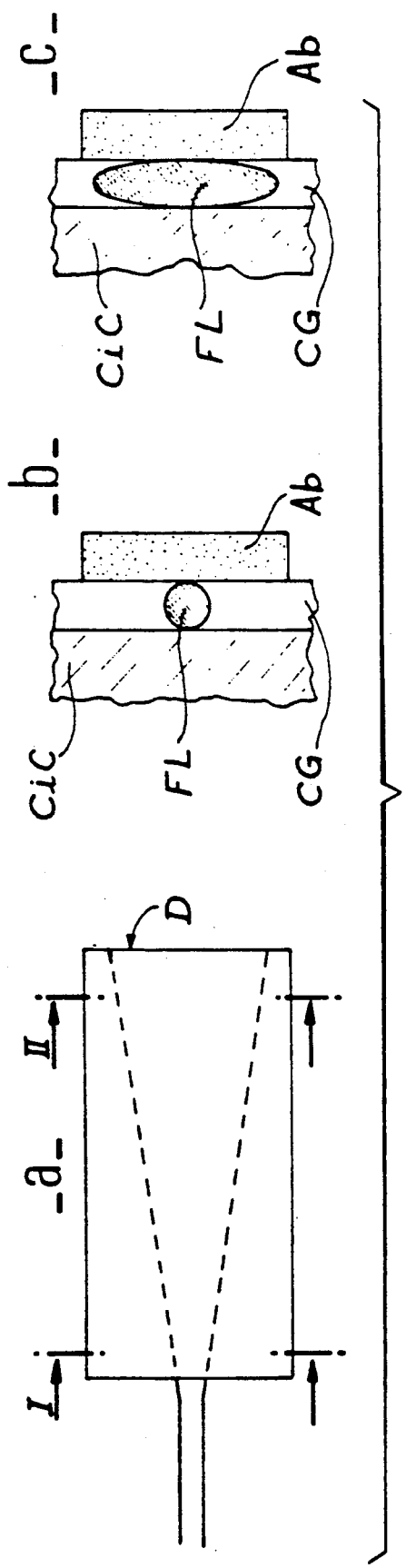
FIG. 2(a), (b), (c), already described, a known embodiment of a beam widening evanescent wave device.
Figure 3:
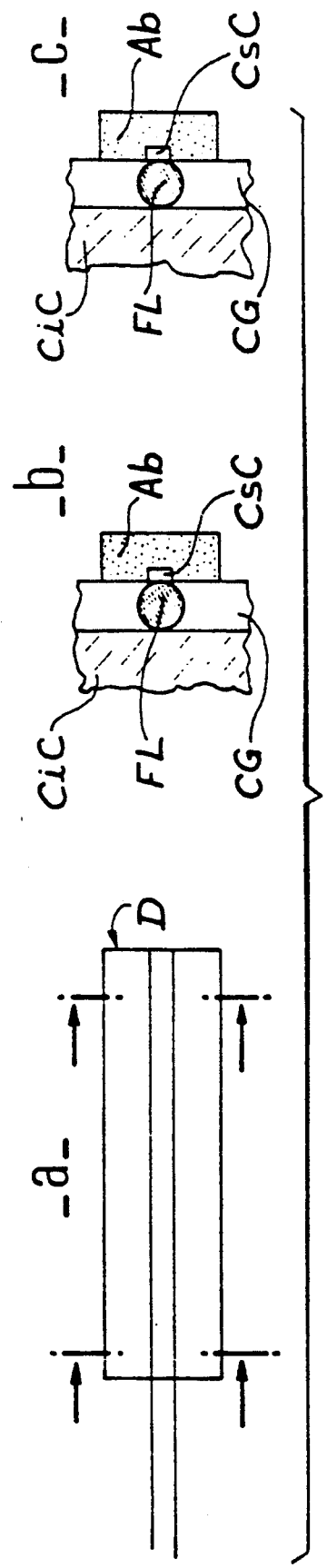
FIG. 3(a), (b), (c), already described, another known embodiment of an evanescent wave device without beam widening.
Figure 4:
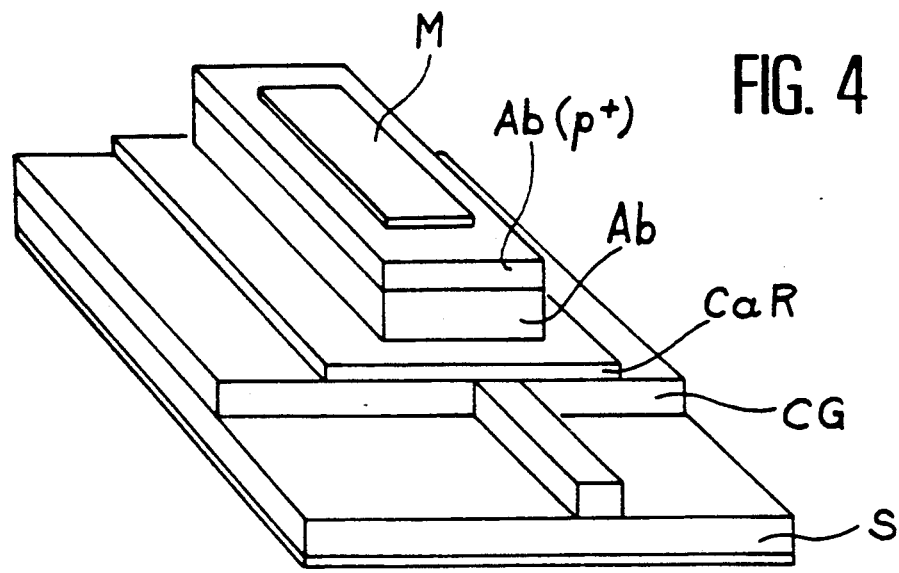
FIG. 4, already described, a known device with an anti-reflection adaptation layer.
Figure 5:
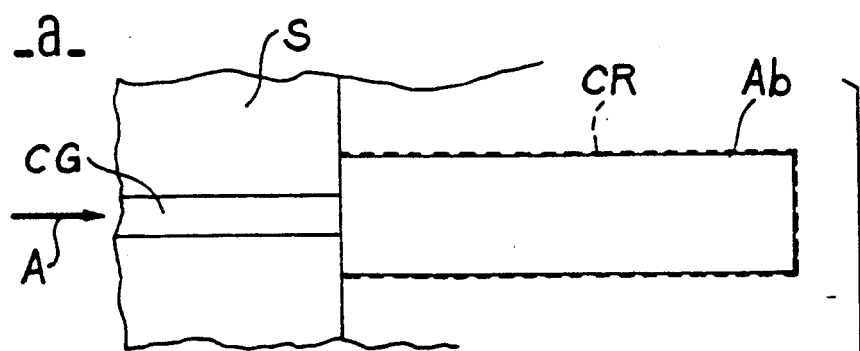
FIG. 5(a), (b), in plan view and in section a device according to the invention.
Figure 5:
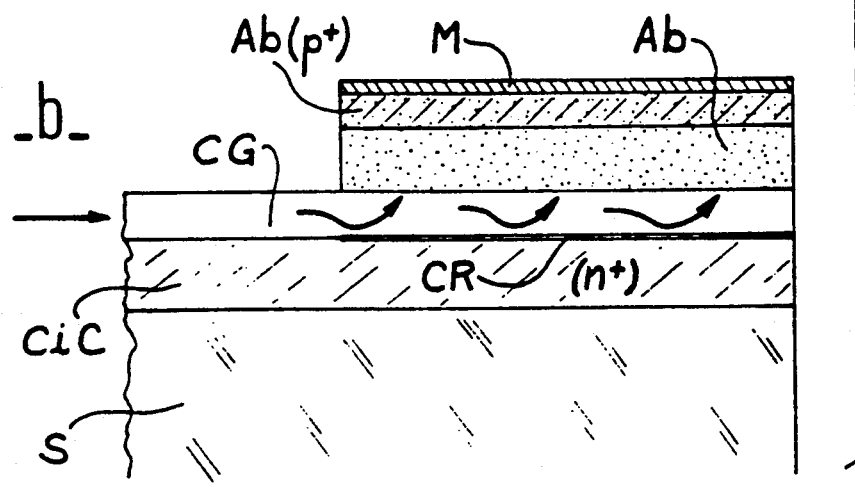

FIG. 5 shows a device according to the invention, in plan view in part a and in section in part b. Apart from the means described hereinbefore (substrate S, lower confinement layer CiC, guide layer CG, absorbent layer Ab), the device comprises a partial reflecting layer CR located at the interface between the guide layer CG and the lower confinement layer CiC. The layer CR can be n+ doped.

In the illustrated variant, it can also be seen that there is no upper confinement layer. Moreover, the absorbent Ab, partly p+ (Zn) over a thickness of approximately 0.5 μm on the surface, is covered with a metal layer CM, which constitutes the electrical output of the detector.

The invention is applicable both to cases of guide layers with a limited thickness and to those having a significant thickness. The difference essentially relates to the absorption lengths. For example, in the prior art, a 90% absorption on 50 μm is related to a 0.9 μm thick guide layer and R. J. DERI et al describe a 190 μm long detector for the same absorption with a 3.5 μm thick guide.

The absorption length is shorter on a guide of limited thickness. Thick monomode guides are obtained by using a small index difference between that of the guide layer and that of the confinement layers. In the invention, use is made in this case with a propagation at e.g. a wavelength of 1.5 μm of an InGaAsP layer of index 3.38 and for the lower confinement layer an InGaAsP layer of index 3.37 (slightly lower). Air is used as the upper confinement material. In order to be monomodal, the guide layer must have a thickness of approximately 3 μm.

The guides of limited thickness are obtained by using a large index difference between that of the guide layer and that of the confinement layers. In the invention, the guide layer is e.g. constituted by an InGaAsP quaternary layer which, for a certain concentration of these components, has an index of 3.46. Use is made in the case of the confinement layers of InGaAsP layers with an index of 3.354. The guide is monomodal for a thickness below 0.9 μm.

In both cases, the quaternary GaInAs material will be used as the detection absorbing material and is placed above the guide. To permit this positioning, in the case of small thicknesses, the upper confinement layer is etched to the guide.

Figure 6:
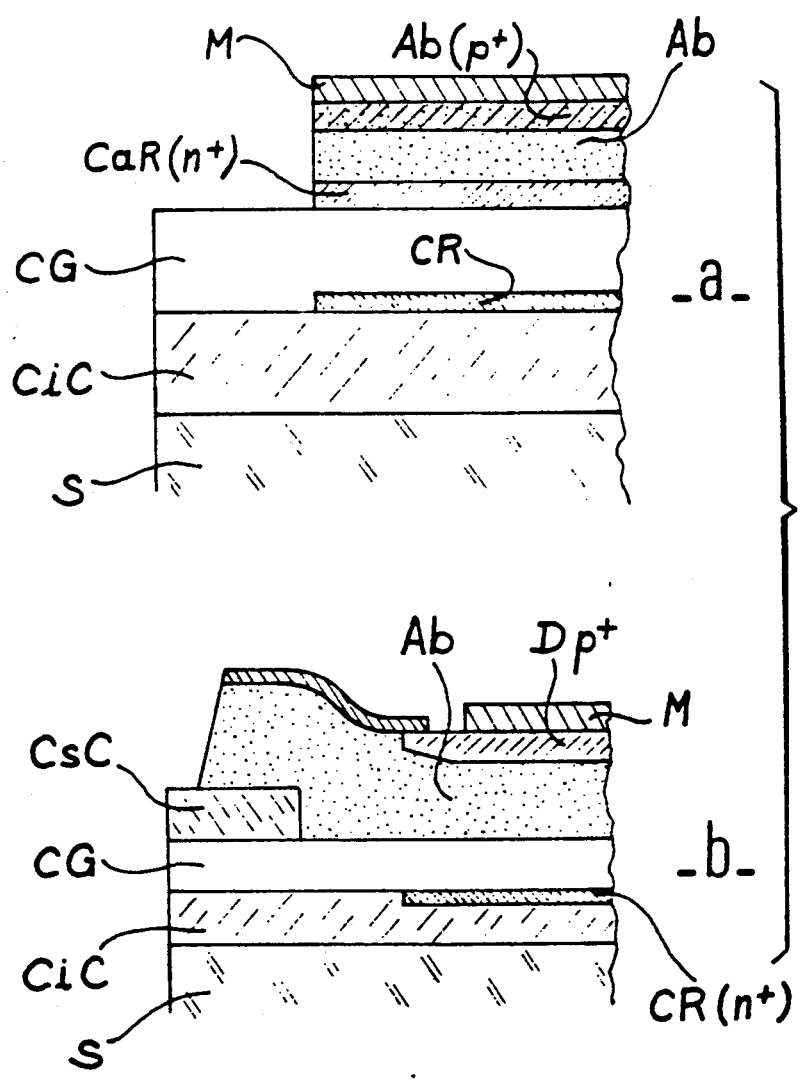
FIG. 6(a), (b), two embodiments corresponding to a thick or thin guide layer.

These two embodiments (thick layer/thin layer) are illustrated in section in FIG. 6 (parts a and b). In part a, the reflecting layer CR is located in the lower part of the guide layer CG. In part b, the reflecting layer CR is located in the upper part of the lower confinement layer CiC. The reflecting layer can either be positioned as in a, or as in b, for both embodiments.

The reflecting layer CR must have an index below that of the confinement layers. For the case of thick guides, it is possible to start with a guide made from quaternary GaInAsP, e.g. with an index close to 3.38 and 3.37, i.e. having a forbidden band around 1.3 μm for a guide thickness of 3 μm. In this case, it is possible to choose a reflecting layer of much lower index 3.17. The reflection at the interface is in this case higher than the value assumed without said layer. Thus, the light is returned towards the absorption layer Ab. Thus, there is a double absorption length reduction in this example.

The action of the reflecting layer CR can be reinforced by the addition of an anti-reflection layer placed above the guide layer beneath the absorbent (as described by R. J. DERI et al). Said layer CaR(n+) on part a of FIG. 6 makes it possible to reduce the reflectivity of the guide-absorbent interface and therefore facilitate the passage of light into the absorbing material. The combination of said anti-reflection layer and the reflecting layer according to the invention makes it possible to reduce the absorption length by approximately five times.

The absorption for the 0.9 μm thick guide is twice higher with the reflecting layer. Without said layer and with evanescent coupling, the absorption is approximately 1000 cm$^{-1}$. It reaches 2000$^{-1}$ for a thickness exceeding approximately 0.4 μm for the InP layer of index 3.17 (below the index of the lower confinement layer of 3.38).

The thickness is not critical, the absorption remaining constant in said zone, which facilitates the production of the structure. Thus, a very short absorption length of 23 μm is obtained for 99% absorption in place of 46 μm.

The reflecting layer reduces the natural widening of the beam by reducing the absorption length. For a much more complete absorption (99%), in the case of the 3 μm thick guide and with an anti-reflection layer, the detection length is 250 μm and its width, taking account of the widening, is min. 30 μm. These values are reduced to 135 μm for the length and 15 μm for the width using a reflecting layer according to the invention, which increases the absorption. Thus, a reduction factor of 4 is obtained for the surface of the detector for 99% absorption without an upper anti-reflection layer.

Three types of detectors can be used in the present invention, namely the PIN photodiode, the photoconductor and the M.S.M. photodetector. The two latter have a surface electrode configuration and the former a volume configuration.

For the PIN diode, the p contact is obtained by diffusion and the n+ contact by doping during the epitaxy of the reflecting layer (cf. part b of FIG. 5). Thus, the intrinsic zone is solely constituted by absorbent material (and the guide layer, if the anti-reflection layer is not used), which permits a fast transit of the charge carriers. The contact on the n+ layer is obtained by making, in the vicinity of the detector, a hole up to the n+ doped layer.

Thus, the PIN-guide configuration with a thick guide layer and a 135×15 μm detecting surface, a n+ doped anti-reflection layer and a reflecting layer beneath the guide, permits an operation at a frequency exceeding 20 GHz for an absorption of 99% with a ternary thickness of 1.7 μm.

As stated, the invention is applicable to all materials making it possible to integrate an optical guide and a detector. The only condition to be respected is that the reflecting layer has an index below that of the confinement layer. On the basis of the indices of the guide layer, the reflecting layer and the lower confinement layer, it is possible to determine the thickness of the reflecting layer which is most suitable for increasing in the optimum possible way the reflectivity at the interface between the guide layer and the lower confinement layer.

The reflecting layer is a ribbon, whose length is substantially that of the detector and whose width is dependent on the expansion of the beam. The ribbon width can exceed said value if the structure requires a widening between the guide and the detector in order to reduce the optical intensity per surface unit reaching the detector. The intensity must be reduced to prevent the saturation of the detector, particularly in structures using guides of limited thickness.

The production of the device according to the invention is subdivided into three stages, firstly the production of the ribbon-like reflecting layer on the substrate, then the deposition of a guide layer and the anti-reflection layer and finally the deposition of an epitaxied absorbent material layer for producing the detector.

In the example of thick guides, the lower confinement layer can be of GaInAsP. It is deposited on an InP substrate with, in the detecting zone, an InP reflecting layer with a thickness exceeding approximately 0.4 μm. This layer is followed by a quaternary, 3 μm thick GaInAsP layer. The GaInAsP material, with a forbidden band of 1.3 μm can prove suitable. It will serve as a guide as a result of its higher index. A GaInAsP anti-reflection layer with an index intermediate between that of the absorbent and that of the guide is placed above the guide layer.

To finish, an absorbent GaInAs layer is deposited, followed by a zinc-doped GaInAs layer. The GaInAs is etched by the dry or wet method, as is the anti-reflection layer. This etching makes it possible to produce a rectangular mesa having dimensions greater than that of the detector. Thus, the photoconductive PIN diode is produced as a result of the upper GaInAs layer for the p+ contact and by sulphur doping of the anti-reflection layer for the n+ contact. The intermediate zone (between n+ and p+) is the intrinsic zone, which must be reduced to a minimum to reduce the transit time of the carriers.

Conventionally, the n+ doped layer is positioned level with the substrate and the intrinsic zone contains the lower confinement layer, the guide layer and the absorbent, which considerably increases the transit time of the charge carriers. The thickness of the absorbent must exceed 1 μm to be effective. Between 1 and 2 μm intrinsic zone, the operating frequencies are between approximately 20 and 50 GHz.

For a photoconductor or M.S.M. diode, the electrodes are located on the surface and it is no longer necessary to dope the anti-reflection layer and add a p+ doped layer. The guide is a ribbon produced by etching the 3 μm thick InP guide layer to permit the lateral confinement.

In the case of FIG. 6, the guides are produced by the deposition of a guide layer and an upper confinement layer on the structure containing the reflecting layer and by etching the upper confinement layer. The etching of the guide is carried out at the same time as the etching at the guide end of the confinement layer in order to position the detector. The thickness of the upper confinement layer must be as small as possible in order to facilitate repeat epitaxy on the step. A minimum choice of 0.5 μm InP is imposed for avoiding absorption before the beam reaches the detector. In this structure, the guide layer is not etched.

The second stage consists of producing an epitaxy repeat of the absorbent material constituting the detector, either by metalorganic epitaxy (MOE), or by molecular beam epitaxy (MBE). This repeat can be localized or total. In the latter case the withdrawal of the absorbent material above the guides is necessary to avoid losses by absorption at the guides.

To limit current leaks, the detector must be placed on a planar surface. For this purpose, it must be approximately 1 μm from the guide end step. The length of this disturbed intermediate zone is minimized by the use of evanescent coupling which facilitates the planarization of the repeat due to a smaller guide end step. In this case, it is appropriate, in order to avoid lags between absorption and detection, to place the reflecting layer in the detecting zone in order to increase absorption at the detector.

These considerations make it possible to use MOE or MBE for epitaxy repeat, although non-planar, as opposed to liquid phase epitaxy (LPE). In this case, it is possible to carry out production using a single epitaxy method, namely either MOE or MBE.

It is finally pointed out that the device according to the invention can be used as an optical probe for sampling part of an optical beam travelling in the guide. The detector length is then reduced to a value below that which would lead to a total absorption. During partial absorption, the optical beam still remains guided by the reflecting layer below the guide and can therefore be used beyond this in the remainder of the circuit.

Naturally, the reflecting layer CR can be constituted by a plurality of layers having different indices.

I claim:

1. Optoelectronic device having an integrated optical guide and photodetector successively comprising on the same semiconductor substrate (S), a first, lower confinement layer (CiC) made from a first material having a first index (n1), a second guide layer (CG) made from a second material having a second index (n2) higher than the first (n1), optionally a third, upper confinement layer (CsG) made from a third material having a third index (n3) below the second (n2), a fourth absorption layer (Ab) made from a fourth material having a fourth index (n4) and able to absorb the radiation from the guide wave (CG) by evanescence, characterized in that the device also comprises a partial reflecting layer (CR) inserted between the lower confinement layer (CiC) and the guide layer (CG) and positioned facing the absorbent layer (Ab), said partial reflecting layer (CR) being made from a fifth material having a fifth index (n5), whose value is outside the range defined by the first index (n1) of the lower confinement layer (CiC) and the second index (n2) of the guide layer (CG).

2. Device according to claim 1, characterized in that the fifth index (n5) of the partial reflecting layer (CR) is below the first index (n1) of the lower confinement layer (CiC).

3. Device according to claim 1, characterized in that the partial reflecting layer (CR) is located in the lower part of the guide layer (CG).

4. Device according to claim 1, characterized in that the partial reflecting layer (CR) is located in the upper part of the lower confinement layer (CiC).

5. Device according to claim 1, characterized in that the partial reflecting layer (CR) is transversely etched to form a ribbon having a width at least equal to the width of absorbent layer (Ab).

6. Device according to claim 1, characterized in that the partial reflecting layer (CR) has a thickness exceeding 0.4 $\mu$m.

7. Device according to claim 1, characterized in that the partial reflecting layer (CR) is constituted by several layers having different indices.

8. Device according to claim 1, characterized in that the first material of the lower confinement layer (CiC) is GaInAsP, the second material of the guide layer (CG) is GaInAsP, the thickness of said guide layer being close to 3 $\mu$m, the upper confinement layer (CsC) being obtained by ambient air and the fifth material constituting the partial reflecting layer (CR) is of InP.

9. Device according to claim 1, characterized in that the first material constituting the lower confinement layer (CiC) is of InGaAsP. The second material constituting the guide layer (CG) is of quaternary alloy InGaAsP, the thickness of said layer being approximately 0.9 $\mu$m, the fourth material constituting the absorption layer (Ab) is of ternary alloy GaInAs and the fifth material constituting the partial reflecting layer (CR) is of quaternary alloy InP.

10. Device according to claim 1, characterized in that it also comprises an anti-reflection layer (CaR) inserted between the guide layer (CG) and the absorbent layer (Ab).

11. Device according to claim 10, characterized in that the material constituting the anti-reflection layer (CaR) is a quaternary alloy GaInAsP.

12. Device according to claim 10, characterized in that the material constituting the anti-reflection layer (CaR) can be n+ doped for the n contact with a PIN diode.

* * * * *